US012755022B2

(12) United States Patent
Suryanarayana et al.

(10) Patent No.: US 12,755,022 B2
(45) Date of Patent: Oct. 6, 2026

(54) TRUST ZONE ATTESTATION FOR SECURE LOADING OF SERVICE OS

(71) Applicant: Dell Products L.P., Round Rock, TX (US)

(72) Inventors: Shekar Babu Suryanarayana, Bangalore (IN); Manjunath Gr, Bangalor (IN); Venkata Rama Krishna Rao Atta, Hyderabad (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/305,507

(22) Filed: Apr. 24, 2023

(65) Prior Publication Data

US 2024/0354416 A1 Oct. 24, 2024

(51) Int. Cl.
*G06F 21/57* (2013.01)
*G06F 3/06* (2006.01)
*G06F 9/4401* (2018.01)

(52) U.S. Cl.
CPC ............ *G06F 21/575* (2013.01); *G06F 3/062* (2013.01); *G06F 3/0634* (2013.01); *G06F 3/0647* (2013.01); *G06F 3/0673* (2013.01); *G06F 9/4406* (2013.01); *G06F 2221/034* (2013.01)

(58) Field of Classification Search
CPC ........................................................ G06F 21/05
See application file for complete search history.

(56) References Cited

U.S. PATENT DOCUMENTS

| | | | | |
|---|---|---|---|---|
| 6,640,294 | B2 * | 10/2003 | Debiez | H04L 9/3236 711/216 |
| 8,775,757 | B2 * | 7/2014 | Polzin | G06F 12/1441 711/E12.091 |
| 10,055,357 | B2 * | 8/2018 | Vidyadhara | G06F 13/28 |
| 10,776,132 | B1 * | 9/2020 | Joshi | G06F 9/4411 |
| 11,295,014 | B2 * | 4/2022 | Cheng | G06F 21/57 |
| 2011/0138147 | A1 * | 6/2011 | Knowles | G06F 9/5016 711/170 |
| 2012/0084552 | A1 * | 4/2012 | Sakthikumar | G06F 21/572 713/100 |
| 2012/0102309 | A1 * | 4/2012 | Lin | G06F 11/2294 713/2 |
| 2015/0072726 | A1 * | 3/2015 | Stern | H04W 12/086 455/552.1 |
| 2017/0010875 | A1 * | 1/2017 | Martinez | G06F 21/60 |
| 2018/0045189 | A1 * | 2/2018 | Lee | G06F 21/72 |
| 2018/0293162 | A1 * | 10/2018 | Tsai | G06F 3/068 |
| 2020/0225994 | A1 * | 7/2020 | Rajagopal | G06T 1/60 |
| 2020/0356357 | A1 * | 11/2020 | Narasimhan | G06F 15/167 |
| 2024/0403432 | A1 * | 12/2024 | Menon | H04L 9/0894 |

* cited by examiner

*Primary Examiner* — Kim Huynh
(74) *Attorney, Agent, or Firm* — Jackson Walker L.L.P.

(57) ABSTRACT

Disclosed subject matter implements a secure, cloud-based boot sequence for a recovery OS. In at least some embodiments, a three phase solution is employed. The first phase, which may occur during the DXE phase of a boot sequence, establishes trust by configuring at least a portion of the system memory as a trust zone RAM disk and attesting modules that interact with the RAM disk. The second phase downloads files from the cloud and performs a cumulative hash verification and handshaking with the EC. During the third phase, a memory identification table for the trust zone is migrated to OS runtime environment to enable secured, OS runtime access to the RAM disk contents.

12 Claims, 4 Drawing Sheets

TRUST ZONE ATTESTATION FOR SECURE LOADING OF SERVICE OS

TECHNICAL FIELD

The present disclosure pertains to secure computing and, more specifically, secure loading of a service operating system (OS).

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Generally, an information handling system is a form of state machine that transitions from one state to the next in a predictable way in response to one or more inputs. Firmware refers to computer software that is responsible for initializing a system to a known state following a hard reset, e.g., powering on the system, and loading or booting an operating system (OS). Those of ordinary skill in the field will readily appreciate the importance of ensuring the authenticity of system firmware.

When an OS is booted from system-resident persistent storage, e.g., a solid state drive (SSD) or hard disk drive (HDD), firmware authenticity is checked via any one or more secure launch mechanisms and check points including, as non-limiting examples, Secure Boot, Trusted Boot, and Core Root of Trust measurement. However, such security measures may not be available in other boot contexts including, as an example, cloud-based methods for booting a service OS (SOS) as part of a recovery solution may utilize a dynamically-created random access memory (RAN) "disk" to store downloaded software and other information and eventually to boot the SOS. RAM-based disk boot methods may include vulnerabilities that enable unauthorized tampering of downloaded payloads and result in arbitrary code execution within the SOS.

SUMMARY

Implementing a secure RAM-based boot is challenging at least because no root of trust is established for the RAM disk that an SOS might be downloaded to and launched from. Similarly, no trust is established for the contents of a RAM disk when the system transitions from a driver execution environment (DXE) to an OS runtime phase. In addition, during a warm boot, RAM disks will generally not be in a clean state and there may be no mechanism to access known good contents.

Such problems are addressed by disclosed subject matter for implementing a secure, cloud-based SOS boot sequence. In at least some embodiments, a three phase solution is employed. The first phase, which may occur during the DXE phase of a boot sequence, establishes trust by configuring at least a portion of the system memory as a trust zone RAM disk and attesting modules that interact with the RAM disk. The second phase downloads files from the cloud and performs a cumulative hash verification and handshaking with the EC. During the third phase, a memory identification table for the trust zone is migrated to OS runtime environment to enable secured, OS runtime access to the RAM disk contents.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
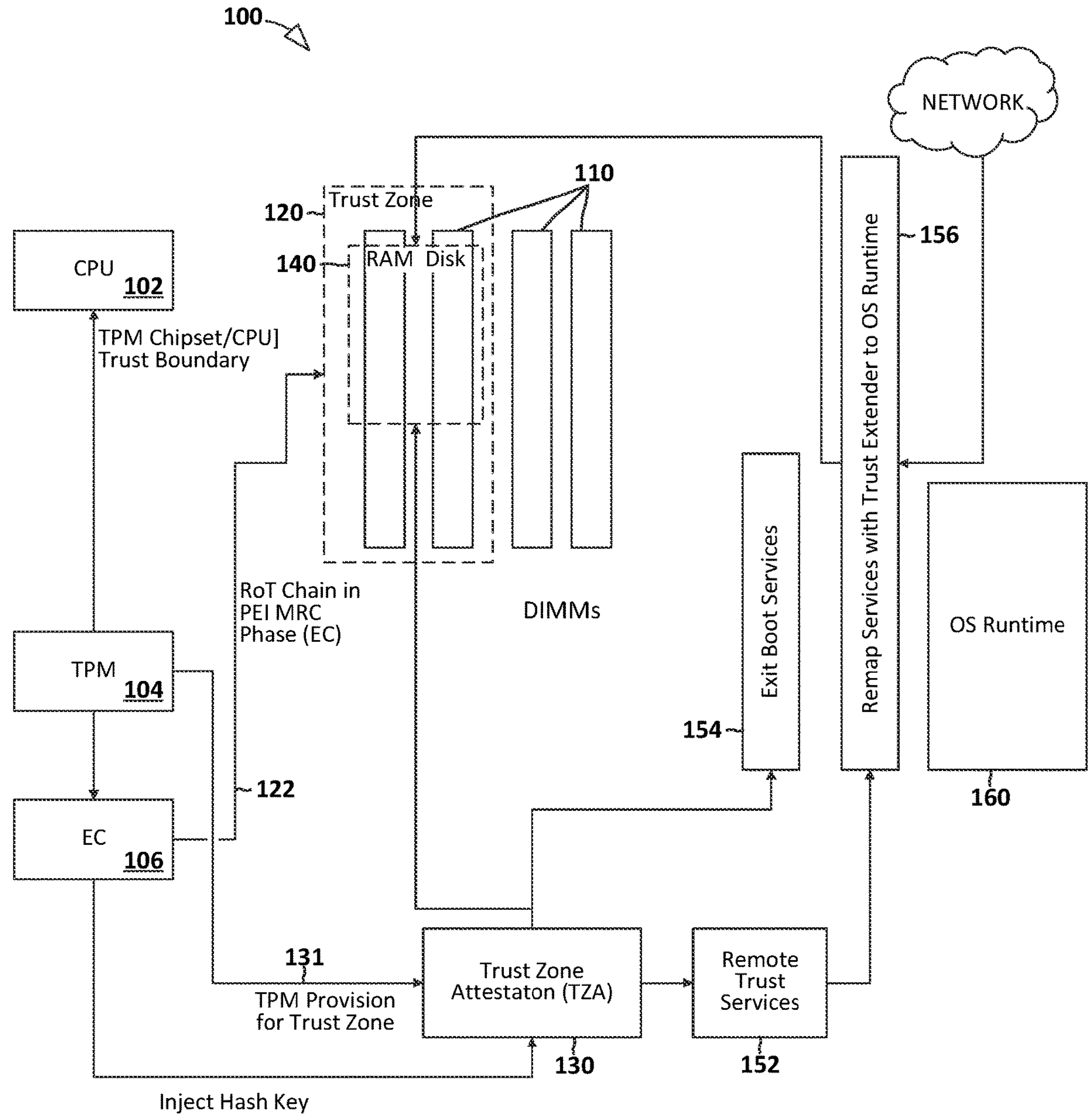
FIG. 1 illustrates an information handling system in accordance with disclosed subject matter for secure recovery OS boot.

Exemplary embodiments and their advantages are best understood by reference to FIGS. 1-4, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates an information handling system which, for the sake of clarity and brevity, is referred to simply as platform 100 featuring secure RAM-disk functionality suitable for a cloud-based recovery solution for booting a service OS. The illustrated platform 100 includes a central processing unit 102, a trusted platform module (TPM) 104, an embedded controller (EC) 106, and system memory including one or more RAM devices represented in FIG. 1 by dual in-line memory modules (DIMMs) 110.

In at least one embodiment, TPM 104 and EC 106 cooperatively interact to establish a root of trust (RoT) chain. As suggested previously, a disclosed solution may encompass three phases including a first phase to establish a root of trust chain, a second phase for downloading and verifying files, and a third phase for establishing trust in a runtime environment. FIG. 1 illustrates aspect of the first phase, i.e., trust establishment. As depicted in FIG. 1, EC 106 configures (122) at least a portion of DIMMs 110 as a trust zone (TZ) 120. The configuration of TZ 120 may occur during a pre-EFI initialization (PEI) phase of a UEFI boot sequence in conjunction with a particular memory reference code (MRC). As depicted in FIG. 1, TPM 104 provisions (131) a TZA service 130 to provide access to a designated portion of TZ 120 referred to as RAM disk 140. TZA service 130 may contain a table (not depicted in FIG. 1) of memory identifiers, dynamically created during the DXE phase of the boot sequence, for the memory resources included in RAM disk 140. Modules for creating and consuming RAM disk 140, including, as an example, a preboot download service, such as the BIOSConnect download service from Dell Technologies, are attested by TZA service 130 before privilege to access TZ 120, including RAM disk 140, is granted. Services attested to by TZA service 130 include remote trust services 152, exit boot services 154, and remap services 156 for extending trust to the OS runtime environment 160. The TZA memory ID table is updated when RAM disk 140 is created, shared to the OS runtime, or destroyed.

During a second phase of the recovery solution, multiple files must be downloaded to successfully boot to a recovery OS. In an exemplary embodiment, platform firmware fetches a signed JavaScript Object Notation (JSON) file including a recovery files list, driver files, hash values for individual files and a cumulative hash encompassing all of the files. The signature of the JSON file may be derived from a service tag or other suitable and unique identifier of the platform. The downloaded files may include an image file for the service OS, e.g., SOS.wim, a boot configuration data (BCD) file, an executable UEFI boot loader file, e.g., bootx64.efi, and one or more driver files for one or more peripheral devices.

Upon successful completion of the file download, firmware calculates a cumulative hash for the recovery files residing on RAM disk 140 and compares the calculated hash with the previously downloaded cumulative hash. Matching the two cumulative hash values establishes trust for the RAM disk contents. In at least one embodiment, the cumulative hash (CH) is computed as a sum of individual file hash values. Each individual hash (IH) value may be calculated or otherwise determined based on a cryptographic hash function such as a secure hash algorithm (SHA)-256 algorithm that returns a 256-bit hash value. In such embodiments, the CH for n individual files:

$$CH = IH1 + IH2 + \dots + IHn \quad \text{(Eq. 1)}$$

If the two CH fail to match, the boot sequence may be aborted.

If the two CH values match, platform firmware may enter the second phase by calculating a Trusted Data Hash (TDH) and sending it to EC 106. The TDH may be a compound or hybrid value that includes an SHA-256 value and one or more other values. In an exemplary embodiment, platform firmware determines the TDH by concatenating an SHA-256 IH for the BCD file of the recovery OS and an address of RAM disk 140, as follows:

$$TDH = \text{Concatenation}(IH(SOS\ BCD\ \text{file}), \text{address}(RAM\ \text{disk})) \quad \text{(Eq. 2)}$$

Before network services are started, the recovery OS may generate a TDH value, using the same algorithm that platform firmware used to calculate the first TDH value, and send to EC 106. EC 106 may then compare the firmware-calculated TDH and the SOS-calculated TDH. If the two TDH values fail to match, EC 104 may terminate the boot sequence and assert a system reset. If the two TDH values match, the SOS may continue.

The second phase as described in the preceding text beneficially provides a hardware-independent attestation that is agnostic with respect to processor technology and platform vendor. In addition, no Internet connection is required to fetch the CH and file component verification is completed without accessing the Internet. Still further, the disclosed process has no dependency on a $3^{rd}$ party or vendor such as a firmware attack surface reduction (FASR) from Microsoft.

Figure 2:
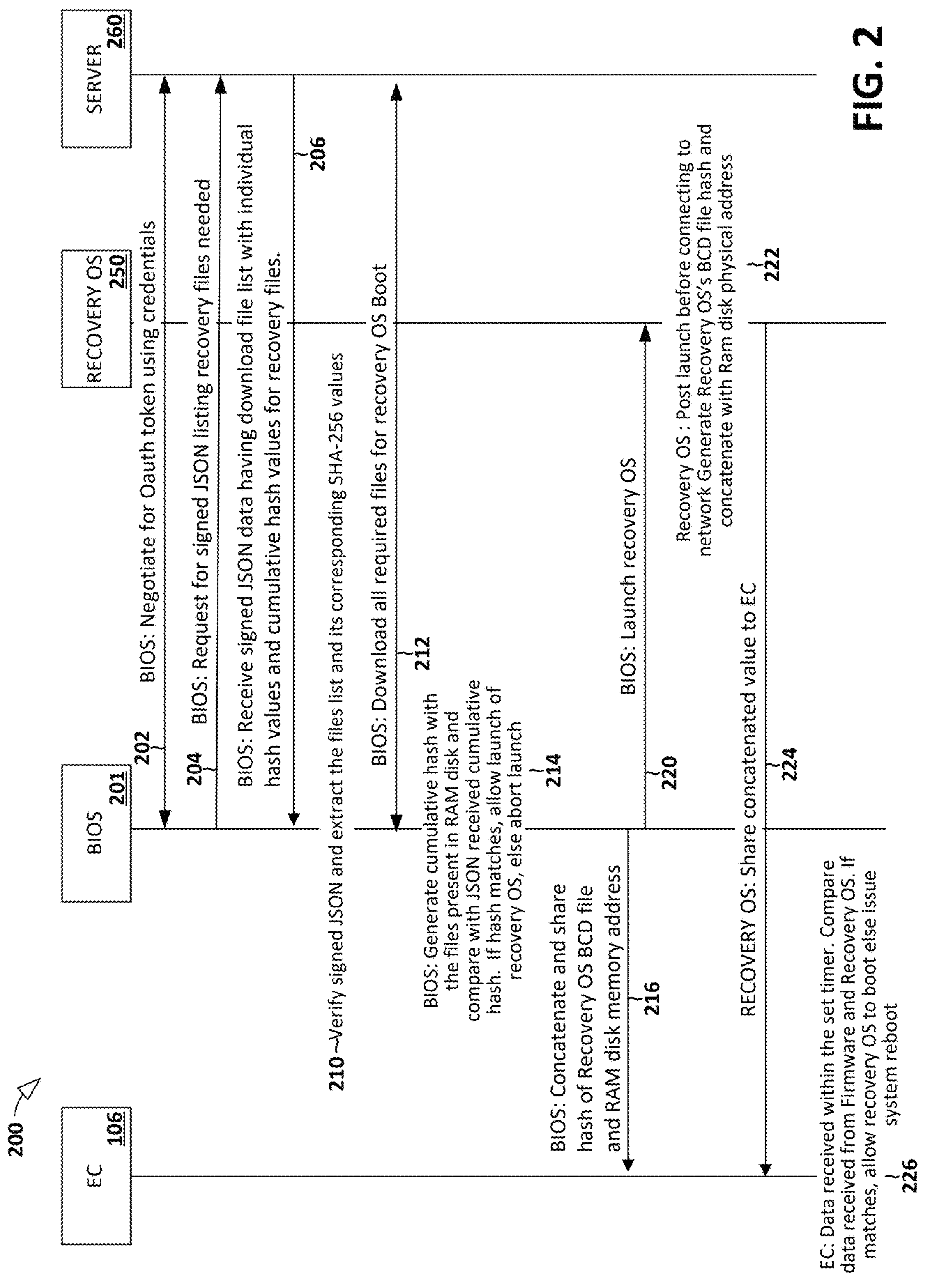
FIG. 2 illustrates aspects of the secure recovery OS boot of FIG. 1.

Referring now to FIG. 2, an example implementation of the previously described second phase is illustrated in a sequence diagram 200 featuring EC 106, BIOS firmware 201, the recovery OS 250, and a server 260. The illustrated sequence 200 begins with BIOS firmware 201 negotiating (202) for an authorization token using pre-existing credentials. BIOS firmware may then issue a request (204) for a signed JSON file listing the recovery files that need to be downloaded, as well as individual and cumulative hash values for the recovery files. The illustrated sequence 200 further includes BIOS firmware 201 receiving (206) the requested JSON file and verifying (210) the file and extracting the files list and its corresponding individual and cumulative hash values. The BIOS firmware 201 then downloads (212) the required files for recovery OS boot. BIOS firmware 201 may then generate (214) a cumulative hash value based on downloaded files present in the RAM disk for comparison with a cumulative hash value included in the JSON filed. If the two cumulative hash values match, launch of the recovery OS continues. Otherwise the launch is aborted.

As depicted in FIG. 2, BIOS firmware may then concatenate (216) the value of the IH of the recovery OS BCD file with the memory address of RAM disk 140 (FIG. 1) before launching (220) the recovery OS (250). Before connecting to network, recovery OS 250, may concatenate (222) an IH value for the recovery OS BCD file with the physical address of RAM disk 140 before sharing (224) the concatenated value to EC 106. EC 106 may then compare (226) the concatenated values received from BIOS firmware 201 and recovery OS 250. If the values match, recovery OS 250 is allowed to boot. Otherwise, a system reset may be issued.

Figure 3:
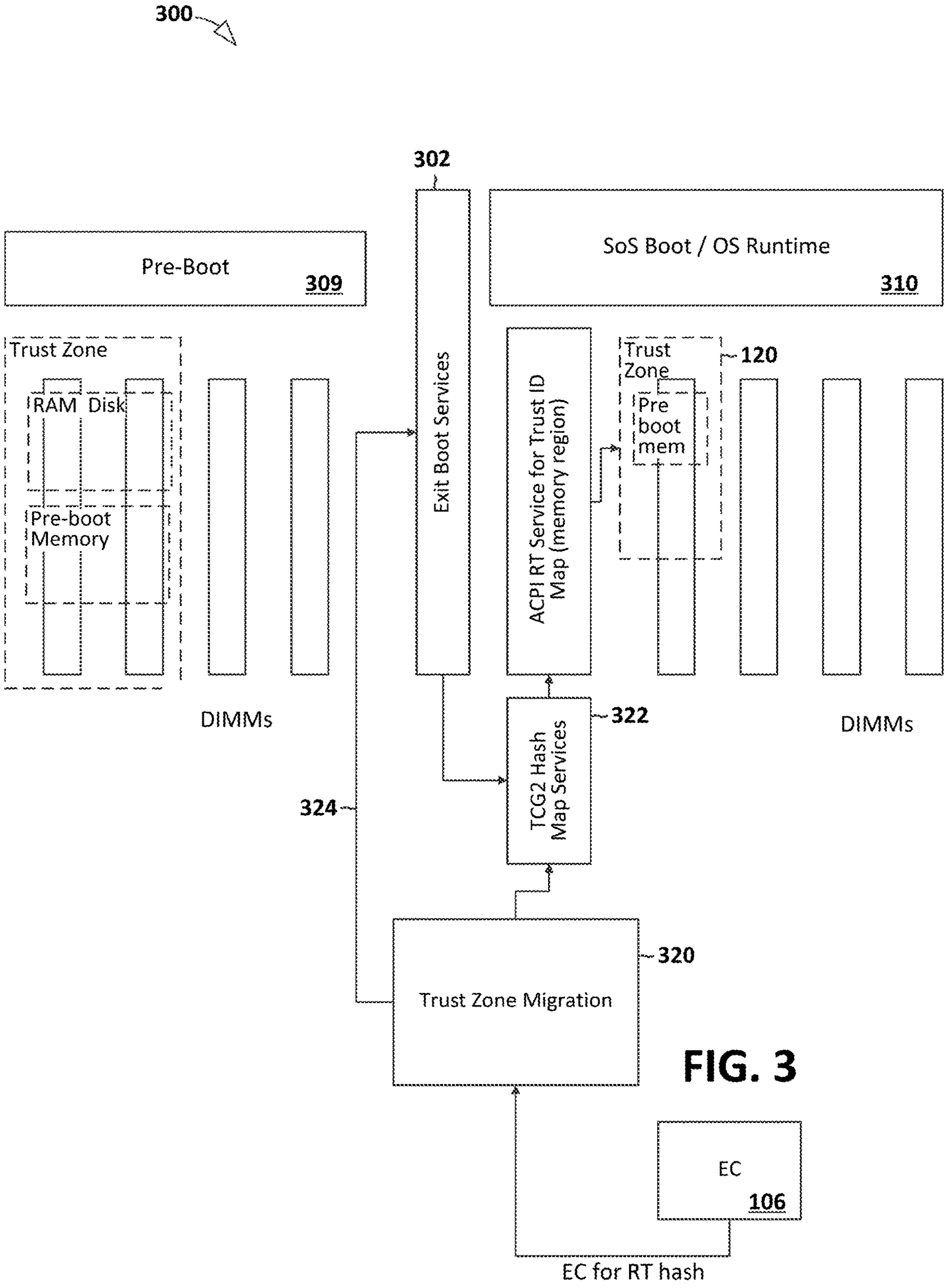
FIG. 3 illustrates additional aspects of the secure recovery OS boot of FIG. 1.

Referring now to FIG. 3, aspects of the previously referenced third phase for establishing trust in a runtime environment are illustrated. When an exit boot service event 302 occurs, memory held by DXE modules may be relinquished while retaining runtime memory only. This process is represented in FIG. 3 by the reduced size of trust zone 120 with respect to recovery OS runtime 310 in comparison to the size of trust zone 120 in the pre-boot context 309. Before OS runtime services can access trustzone-configured memory 120, TZA memory ID tables must be migrated (324) from DXE to OS runtime 310. A trust zone migration service 320 illustrated in FIG. 3, along with EC 106 and TPM hash map services 322, may remap the memory table to the runtime OS environment 310, thereby enabling OS runtime services to access the trusted RAM disk contents, at which point OS services may access the remapped memory table for accessing trusted ram disk contents from trust zone memory.

Figure 4:
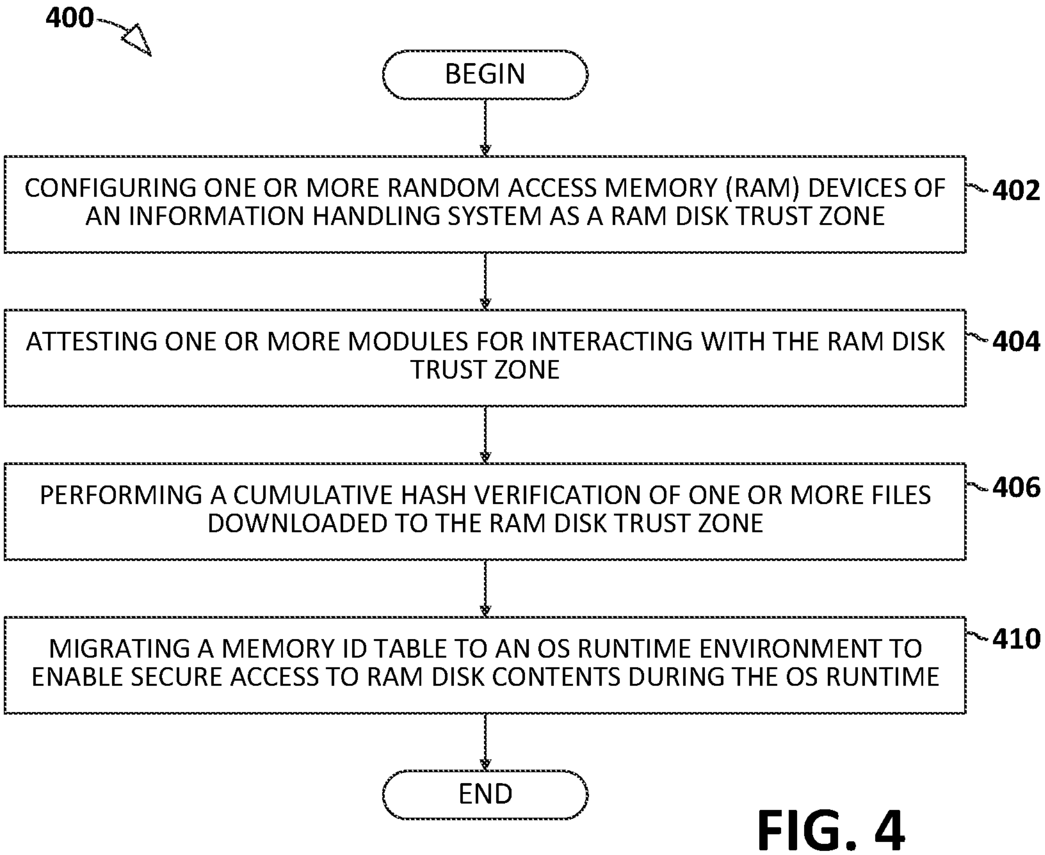
FIG. 4 illustrates a flow diagram of a method for loading an SOS.

Referring now to FIG. 4, a flow diagram illustrates a trust zone attestation method 400 for securely loading an SOS in accordance with disclosed subject matter. As depicted in FIG. 1, the illustrated method 400 includes configuring (step 402) one or RAM devices of an information handling system as a RAM disk trust zone and attesting (step 404) one or more modules for interacting with the RAM disk trust zone. A cumulative hash verification of one or more files downloaded to the RAM disk trust zone is performed (step 406) and a memory ID table is migrated (step 410) to an OS runtime environment to enable secure access to RAM disk contents during the OS runtime.

Figure 5:
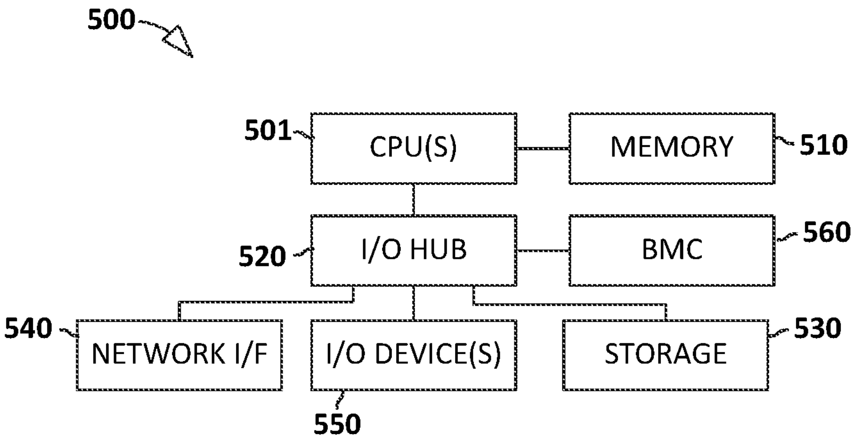
FIG. 5 illustrates an information handling system suitable for use in conjunction with subject matter of FIGS. 1-4.

Referring now to FIG. 5, any one or more of the elements illustrated in FIG. 1 through FIG. 4 may be implemented as or within an information handling system exemplified by the information handling system 500 illustrated in FIG. 5. The illustrated information handling system includes one or more general purpose processors or central processing units (CPUs) 501 communicatively coupled to a memory resource 510 and to an input/output hub 520 to which various I/O resources and/or components are communicatively coupled. The I/O resources explicitly depicted in FIG. 5 include a network interface 540, commonly referred to as a NIC (network interface card), storage resources 530, and additional I/O devices, components, or resources 550 including as non-limiting examples, keyboards, mice, displays, printers, speakers, microphones, etc.

The illustrated information handling system 500 includes an embedded controller EC 560 may provide or support various system management functions and, in at least some implementations, keyboard controller functions. Exemplary system management function that may be supported by EC 560 include thermal management functions supported by pulse width modulation (PWM) interfaces suitable for controlling system fans, power monitoring functions support by an analog-to-digital (ADC) signal that can be used to monitor voltages and, in conjunction with sense resistor, current consumption per power rail. This information could be used to, among other things, monitor battery charging or inform the user or administrator of potentially problematic power supply conditions. EC 560 may support battery management features to control charging of the battery in addition to switching between the battery and AC adapter as the active power source changes or monitoring the various battery status metrics such as temperature, charge level and overall health. EC 560 may support an Advanced Configuration and Power Interface (ACPI) compliant OS by providing status and notifications regarding power management events and by generating wake events to bring the system out of low power states.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method, comprising:

during a pre-EFI initialization (PEI) phase of a universal extensible firmware interface (UEFI) boot sequence for an information handling system including a central processing unit (CPU), a system memory of one or more random access memory (RAM) devices, an embedded controller (EC) to provide one or-more system management functions and one or more keyboard control functions, and a trusted platform manager (TPM), configuring, by the EC, at least a portion of the system memory as a trust zone;

provisioning, by the TPM, a trust zone attestor (TZA) service to enable secure access to a RAM disk, wherein the RAM disk comprises a portion of the trust zone and wherein provisioning the TZA service includes provisioning the TZA service with a memory identifier (ID) table, wherein the memory ID table includes memory identifiers indicative of the portion of the trust zone corresponding to the RAM disk;

attesting, by the TZA service, one or more disk interaction modules to enable said one or more disk interaction modules to access the RAM disk;

fetching a list file, wherein the list file includes a listing of recovery operating system (OS) files for booting the information handling system to a recovery OS, individual hash values for each of the recovery OS files, and a first cumulative hash value encompassing the recovery OS files;

downloading the recovery OS files to the RAM disk; and performing a cumulative hash verification of the recovery OS files, wherein the cumulative hash verification includes calculating, with a cryptographic hash function, individual hash values for each of the recovery OS files and calculating a second cumulative hash value for the recovery OS files residing on the RAM disk and determining whether the second cumulative hash values matches the first cumulative hash value, wherein the second cumulative hash value is calculated by a sum of the individual hash values; and responsive to the second cumulative hash value matching the first cumulative hash value, migrating the memory ID table to a recovery OS runtime environment to enable secure access to RAM disk contents during the OS runtime.

2. The method of claim 1, wherein: the one or more disk interaction modules include any one or more modules selected from: a preboot download service module, a remote trust service module, an exit boot service module, and a remap service extending trust to recovery OS runtime.

3. The method of claim 1, wherein the TZA service a creates the memory ID table during a driver execution environment (DXE) phase of the UEFI boot sequence.

4. The method of claim 1, further comprising:

dynamically updating the memory ID table in response to: creating the RAM disk, destroying the RAM disk, or sharing the RAM disk to the recovery OS runtime phase.

5. The method of claim 1, wherein the list file comprise a digitally signed JavaScript Object Notation (JSON) file.

6. The method of claim 1, wherein the recovery OS files include a recovery OS image file, a boot configuration data (BCD) file, an executable UEFI boot loader file, and one or more driver files for one or more peripheral devices.

7. An information handling system, comprising:

a central processing unit (CPU);

a trusted platform manager (TPM);

an embedded controller (EC) to provide one or more system management functions and one or more keyboard controller functions; and a system memory, of one or more random access memory (RAM) devices, including processor-executable instructions that, when executed by the CPU, cause the system to perform operations including:

during a pre-EFI initialization (PEI) phase of a universal extensible firmware interface (UEFI) boot sequence for the information handling system, configuring, by the EC, at least a portion of the system memory as a trust zone;

provisioning, by the TPM, a trust zone attestor (TZA) service to enable secure access to a RAM disk, wherein the RAM disk comprises a portion of the trust zone and wherein provisioning the TZA service includes provisioning the TZA service with a memory identifier (ID) table, wherein the memory ID table includes memory identifiers indicative of the portion of the trust zone corresponding to the RAM disk;

attesting, by the TZA service, one or more disk interaction modules to enable said one or more disk interaction modules to access the RAM disk;

fetching a list file, wherein the list file includes a listing of recovery operating system (OS) files for booting the information handling system to a recovery OS, individual hash values for each of the recovery OS files, and a first cumulative hash value encompassing the recovery OS files;

downloading the recovery OS files to the RAM disk; and performing a cumulative hash verification of the recovery OS files, wherein the cumulative hash verification includes calculating a second cumulative hash value for the recovery OS files residing on the RAM disk and determining whether the second cumulative hash values matches the first cumulative hash value; and responsive to the second cumulative hash value matching the first cumulative hash value, migrating the memory ID table to a recovery OS runtime environment to enable secure access to RAM disk contents during the OS runtime.

8. The information handling system of claim 7, wherein, the one or more disk interaction modules include any one or more modules selected from: a preboot download service module, a remote trust service module, an exit boot service module, and a remap service extending trust to recovery OS runtime.

9. The information handling system of claim 7, wherein the TZA service creates the memory ID table during a driver execution environment (DXE) phase of the UEFI boot sequence.

10. The information handling system of claim 7, wherein the operations include:

dynamically updating the memory ID table in response to: creating the RAM disk, destroying the RAM disk, or sharing the RAM disk to the recovery OS runtime phase.

11. The information handling system of claim 7, wherein the list file comprises a digitally signed JavaScript Object Notation (JSON) file.

12. The information handling system of claim 7, wherein the recovery OS files include a recovery OS image file, a boot configuration data (BCD) file, an executable UEFI boot loader file, and one or more driver files for one or more peripheral devices.

* * * * *